(12) United States Patent
Fukushima et al.

(10) Patent No.: US 6,350,965 B2
(45) Date of Patent: Feb. 26, 2002

(54) DRAINAGE HOLE STRUCTURE IN AN OVEN OF FORCED CONVECTION TYPE

(75) Inventors: Kei Fukushima; Hiroshi Matsuo, both of Tsurugashima (JP)

(73) Assignee: Fujimak Corporation, Tokyo (JP)

( * ) Notice: Subject to any disclaimer, the term of this patent is extended or adjusted under 35 U.S.C. 154(b) by 0 days.

(21) Appl. No.: 09/833,875

(22) Filed: Apr. 12, 2001

(30) Foreign Application Priority Data

Apr. 20, 2000 (JP) ........................................ 2000-119074

(51) Int. Cl.$^7$ ................................................ A21B 1/24
(52) U.S. Cl. .................... 219/401; 219/400; 99/474; 126/20
(58) Field of Search ................................ 219/401, 400; 99/330, 474, 476; 126/20

(56) References Cited

U.S. PATENT DOCUMENTS

| 4,506,598 A | * | 3/1985 | Meister ........................ 99/330 |
| 5,014,679 A | * | 5/1991 | Childs et al. .................. 99/476 |
| 5,552,578 A | * | 9/1996 | Violi ........................... 219/401 |
| 5,649,528 A | * | 7/1997 | Oslin et al. .................... 126/20 |
| 5,768,982 A | * | 6/1998 | Violi et al. ..................... 99/476 |
| 6,175,100 B1 | * | 1/2001 | Creamer et al. ............. 219/401 |

* cited by examiner

*Primary Examiner*—Joseph Pelham
(74) *Attorney, Agent, or Firm*—Frishauf, Holtz, Goodman, Langer & Chick, P.C.

(57) ABSTRACT

A drainage hole structure in a cooking oven of forced convection type, utilizing: a drain pipe arranged so that an upper end opening thereof is open to a bottom face portion of a heating chamber and a lower end opening thereof is open to the outside of the heating chamber; and an air suction pipe arranged so that one end opening thereof faces to the upper end opening of the drain pipe in close proximity thereto and the other end opening thereof is open to a middle portion in the heating chamber, wherein the one end opening of the air suction pipe is formed to be slightly larger than the upper end opening of the drain pipe, and in the upper end opening side of the drain pipe, a peripheral wall portion of the drain pipe positioned in an upstream side with respect to an airflow flowing along the bottom face portion of the heating chamber is extended so as to enter into the one end opening of the air suction pipe by only a short distance, while a peripheral wall portion of the drain pipe positioned in a downstream side with respect to the airflow flowing along the bottom face portion of the heating chamber is terminated at a level substantially equal to or lower than the bottom face portion of the heating chamber.

3 Claims, 2 Drawing Sheets

DRAINAGE HOLE STRUCTURE IN AN OVEN OF FORCED CONVECTION TYPE

FIELD OF THE INVENTION

The present invention relates to a drainage hole structure in an oven of forced convection type.

DESCRIPTION OF THE PRIOR ART

Conventionally, wide variety kinds of heating apparatuses including a microwave oven, a microwave heating oven or the like, have been developed and used. Some of them employ a certain kind of heating chamber in which a hot air is circulated and to which a positive pressure is applied, and they are represented by, for example, a cooking apparatus of forced convection type and a cooking apparatus utilizing impingement heat jet heating. Further, some of them employ such heating chambers into which water, hot water, steam or the like are introduced, and they are represented by, for example, a steamer and a complex heating oven of forced convection type added with a steaming function or a steamer.

In an oven of forced convection type (hereafter those cooking apparatuses as described above generally referred to as the ovens of forced convection type), particularly in a case where water, hot water, steam or the like are introduced into a heating chamber for cooking or cleaning, a drainage hole must be provided.

Since when the drainage hole in the heating chamber is open to the atmosphere, a heat (an air) leaks to the outside thus to cause an energy loss and a thermal affection to the circumstance, therefore such a drainage hole structure in which the drainage hole is equipped with a lid in order to prevent such air leakage has been employed. However, such structure employing the lid has exhibited the following problems. That is, dirt, which has been accumulated, makes it difficult for the lid to be taken out. In addition, a care must be taken to accomplish air tightness. Further, during the lid being taken out, a trouble might be caused associated with the handling of this removed lid. For example, a care must be taken in order to keep the removed lid without missing it.

In another drainage hole structure according to the prior art, a drainage hole has been provided with a valve, such as a ball valve, an electromagnetic valve or the like. However, the structure employing such a valve also has exhibited the following problems. That is, because there is a valve mechanism in a drainage path, dirt is likely to be accumulated and the cleaning is difficult to be conducted therein. The accumulated dirt obstructs a regular operation of the valve, which is likely to result in a break down. A care must be taken also to accomplish a heat resisting of a valve sealing portion.

An object of the present invention is to provide a drainage hole structure in an oven of forced convection type, which can solve the problems associated with the prior technology as described above.

SUMMARY OF THE INVENTION

A drainage hole structure in a cooking oven of forced convection type according to the present invention comprises: a drain pipe arranged so that an upper end opening thereof is open to a bottom face portion of a heating chamber and a lower end opening thereof is open to the outside of said heating chamber; and an air suction pipe arranged so that one end opening thereof faces to said upper end opening of said drain pipe in close proximity thereto and the other end opening thereof is open to a middle portion in said heating chamber; wherein said one end opening of said air suction pipe is formed to be slightly larger than said upper end opening of said drain pipe; and, in said upper end opening side of said drain pipe, a peripheral wall portion of said drain pipe positioned in an upstream side with respect to an airflow flowing along the bottom face portion of said heating chamber is extended so as to enter into said one end opening of said air suction pipe by only a short distance, while a peripheral wall portion of said drain pipe positioned in a downstream side with respect to the airflow flowing along the bottom face portion of said heating chamber is terminated at a level substantially equal to or lower than said bottom face portion of said heating chamber.

According to an embodiment of the present invention, said upper end opening of said drain pipe is located in close proximity to an air blowing side of a fan used for a forced convection, which is arranged in a back face side of said heating chamber, and said other end opening of said air suction pipe is located in close proximity to an air suction side of said fan.

According to another embodiment of the present invention, said air suction pipe is integrated with a fan guard which is to be disposed in front of said fan.

DESCRIPTION OF THE PREFERRED EMBODIMENTS

The present invention will now be described in detail with respect to preferred embodiments thereof in conjunction with the attached drawings.

Figure 1:
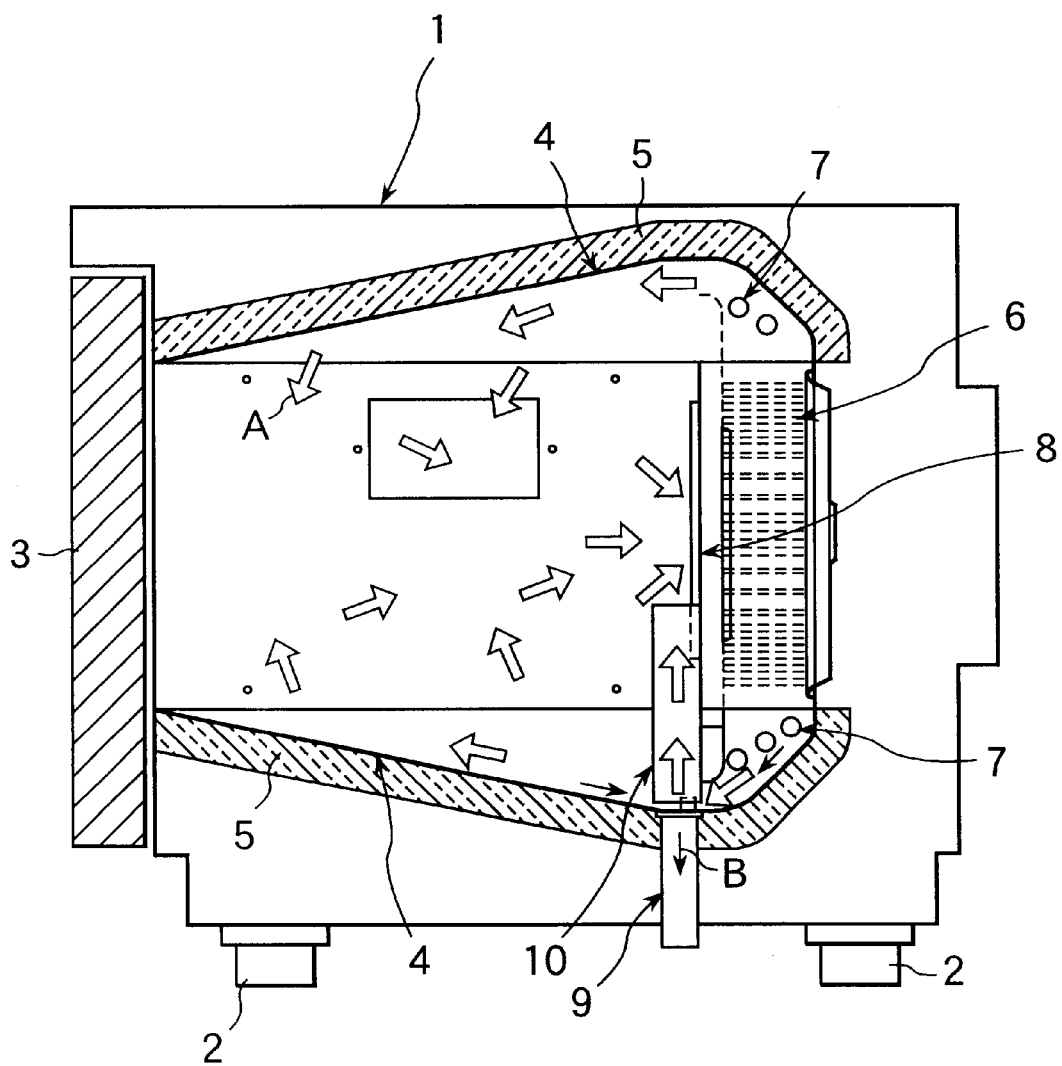
FIG. 1 is a schematic cross sectional view of an oven of forced convection type having a drainage hole structure of an embodiment according to the present invention.

FIG. 1 is a schematic cross sectional view of an oven of forced convection type including a drainage hole structure of an embodiment according to the present invention. As shown in FIG. 1, this oven of forced convection type has an exterior housing 1 with legs 2 respectively attached to each of four corners of the bottom portion of the exterior housing 1. A door 3 is installed on a front face side of the exterior housing 1 to expose or close an opening through which foods to be cooked are inserted into or taken out of a heating chamber. This heating chamber of the oven is defined by said door 3 and a heating chamber wall member 4 arranged in an inner side of the exterior housing 1. A heat insulating material 5 is mounted on an outer side of the heating chamber wall member 4. A fan 6 for performing a forced convection is disposed in a back face side of the heating chamber, and an electric heater 7 is disposed so as to surround this fan 6. Further, a fan guard 8 is detachably disposed in a front face side of the fan 6.

This fan 6 has its front face side, where the fan guard 8 is located, defined as an air suction side, and its peripheral portion, where the heater 7 is located, defined as an air blowing side. Accordingly, during the fan 6 being under operation, the air within the heating chamber is sucked through the fan guard 8 and blown back into the heating chamber from the peripheral portion of the fan 6 passing through the electric heater 7. At that time, the air is heated by the electric heater 7 to be hot air, which is then circulated within the heating chamber. Such airflow is indicated with an arrow A in FIG. 1.

This oven of forced convection type is provided with a drain pipe 9 and a suction air pipe 10 according to a drainage hole structure of the present invention. A food loaded onto a turntable (not shown), which is typically arranged within the heating chamber, is cooked with such hot air. At that time, in order to steam the food it is sometimes practiced that water, hot water or steam is introduced into the heating chamber by an appropriate means (not shown). Accordingly, since there is a possibility that the water content is collected within the heating chamber, said drainage hole structure is installed therein in order to provide a function for draining away such water content.

Figure 2:
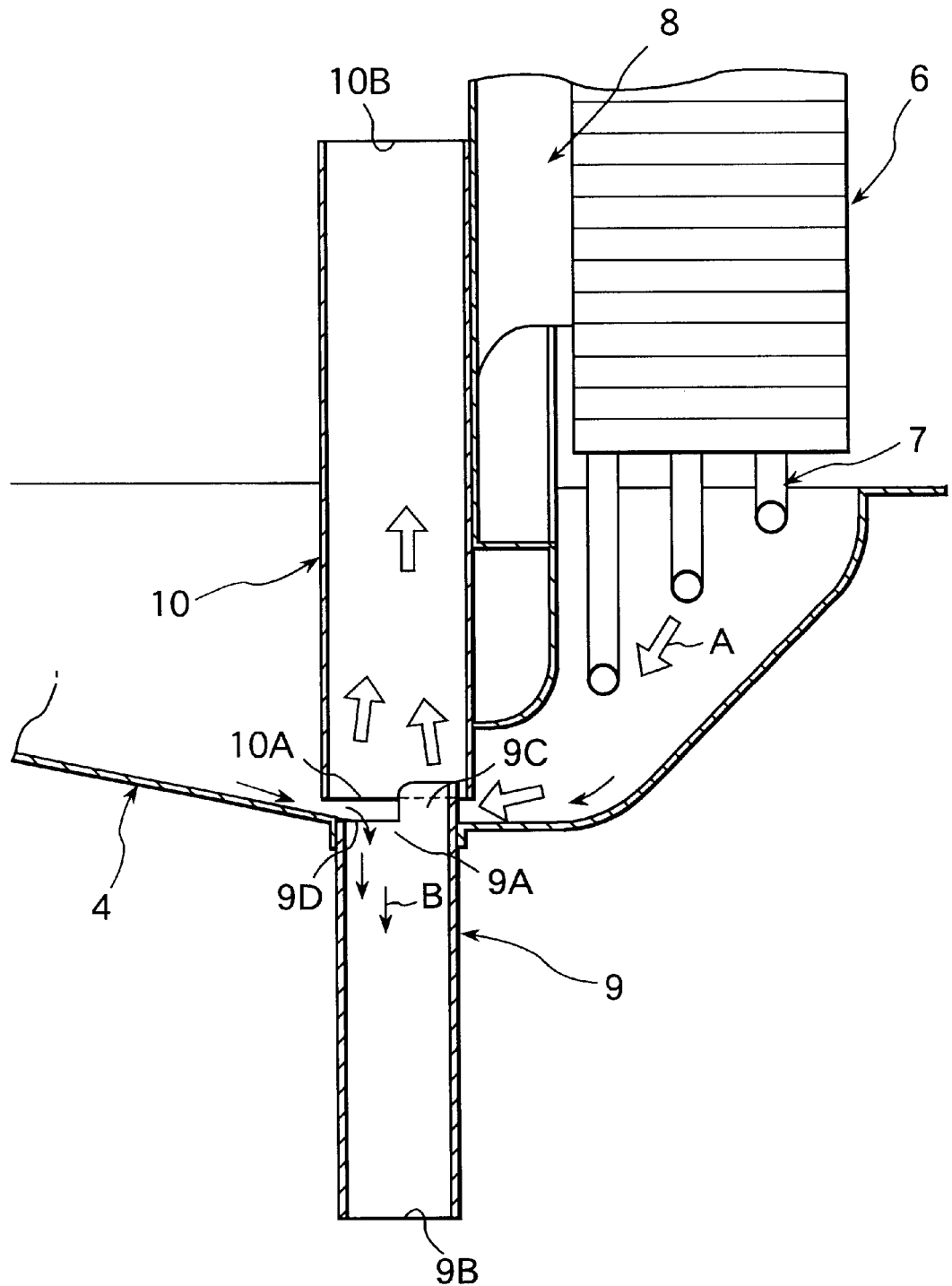
FIG. 2 is an enlarged partial view, illustrating in more detail the drainage hole structure in the oven of forced convection type of FIG. 1.

FIG. 2 is an enlarged partial view of the drain pipe 9 and the air suction pipe 10, illustrating in more detail the drainage hole structure described above. The structure and operation of the drainage hole structure of the present invention will be described in more detail with reference to FIG. 2. First of all, the drain pipe 9 is attached to the heating chamber wall member 4, such that an upper end opening 9A is open to a bottom face portion of the heating chamber and a lower end opening 9B is open to the outside of the heating chamber. On the other hand, the air suction pipe 10 is attached to the fan guard 8, such that one opening thereof 10A faces to the upper end opening 9A of the drain pipe 9 in close proximity thereto and the other opening thereof 10B is open to a middle portion in the heating chamber. In this embodiment, the air suction pipe 10 is integrated with the fan guard 8 and is detachably installed in the heating chamber together with the fan guard 8.

As clearly shown in FIG. 2, the one end opening 10A of the air suction pipe 10 is formed to be slightly larger than the upper end opening 9A of the drain pipe 9. Further, in an upper end opening 9A side of the drain pipe 9, a peripheral wall portion 9C of the drain pipe 9 positioned in an upstream side with respect to an airflow (as indicated with an arrow A) flowing along the bottom face of the heating chamber is extended so as to enter into the one end opening 10A of the air suction pipe 10 by only a small distance. On the other hand, another peripheral wall portion 9D of the drain pipe 9 positioned in a downstream side with respect to the airflow flowing along the bottom face of the heating chamber is terminated at a level substantially equal to or lower than the bottom face portion of the heating chamber.

Further, as clearly shown in FIG. 2, in this embodiment, the upper end opening 9A of the drain pipe 9 is located in close proximity to an air blowing side of the fan 6 used for the forced convection, arranged in the back face side of the heating chamber, while the other end opening 10B of the air suction pipe 10 is located in close proximity to the air suction side of the fan 6.

A drain operation and an air suction operation in such structure will now be described. In FIGS. 1 and 2, the arrow A indicates the airflow and the arrow B indicates the water flow. During the fan being actuated, as indicated with the arrow A, the air blown from the periphery of the fan toward the bottom face portion of the heating chamber impinges upon the peripheral wall portion 9C extending upwardly from the drain pipe 9, and is caused to pass through a gap between the outer face of this peripheral wall portion 9C and the peripheral wall inner surface of the one end opening 10A of the air suction pipe 10, so as to be directed upwardly into the air suction pipe 10 and discharged from the other end opening 10B into the air suction side of the fan 6. Accordingly, it prevents the air from escaping to the outside of the heating chamber via the inside of the drain pipe 9. On the other hand, as indicated with the arrow B, the water generated inside the heating chamber flows toward the upper end opening 9A of the drain pipe 9 along the bottom face portion of the heating chamber and eventually into the drain pipe 9 through a clearance between the upper end opening 9A of the drain pipe 9 and the one end opening 10A of the air suction pipe 10, thus to be drained to the outside from the lower end opening 9B of the drain pipe 9.

A flow rate of the air sucked by the fan 6 from the air suction pipe 10 may be varied by adjusting an opening diameter and a length of the air suction pipe 10, an opening diameter and a length of the drain pipe 9, a height and a peripheral length of the peripheral wall portion 9C extending from the upper end opening 9A of the drain pipe 9, a clearance between the one end opening 10A of the air suction pipe 10 and the upper end opening 9A of the drain pipe 9, or the like.

Herein, if the difference between the diameter of the upper end opening 9A of the drain pipe 9 and the diameter of the one end opening 10A of the air suction pipe 10 is reduced, and the clearance between the one end opening 10A of the air suction pipe 10 and the upper end opening 9A of the drain pipe 9 is also made smaller, so that the flow rate of the air blown upwardly into the suction pipe from the bottom face portion of the heating chamber is increased and a negative pressured could be generated in the side of the upper end opening 9A of the drain pipe 9, an outside air can be actively induced to enter through the drain pipe 9 into the heating chamber. Such modification allows the drain pipe 9 to serve both as a drainage hole and an air suction opening.

Since a simplified drainage hole structure according to the present invention, which comprises only a drain pipe and an air suction pipe, allows the draining to be performed without a heat (an air) inside the heating chamber escaping to the outside, it would not be necessary to take much care in handling and there would be no fear of a break down by dirt.

Such simplified pipe-structure also facilitates the cleaning to be performed more easily.

A drain pipe can be designed to serve both as a drainage hole and an air suction opening, and this allows no separate air suction opening to be provided even in a cooking apparatus which requires a suction air, and also allows the cost to be reduced.

Since an air suction pipe can be integrated with a fan guard or the like, there is no fear that the air suction pipe is forgetfully omitted upon installation. Accordingly, there is no need of installing additional mechanism for preventing an accident that the air suction pipe would forgetfully omitted upon installation, thus allowing the cost to be reduced.

What is claimed is:

1. A drainage hole structure in a cooking oven of forced convection type, comprising:

a drain pipe arranged so that an upper end opening thereof is open to a bottom face portion of a heating chamber and a lower end opening thereof is open to an outside of said heating chamber; and an air suction pipe arranged so that one end opening thereof faces to said upper end opening of said drain pipe in close proximity hereto and the other end opening thereof is open to a middle portion in said heating chamber;

wherein said one end opening of said air suction pipe is formed to be slightly larger than said upper end opening of said drain pipe; and in said upper end opening side of said drain pipe, a peripheral wall portion of said drain pipe positioned in an upstream side with respect to an airflow flowing along the bottom face portion of said heating chamber is extended so as to enter into said one end opening of said air suction pipe by only a short distance, while a peripheral wall portion of said drain pipe positioned in a downstream side with respect to the airflow flowing along the bottom face portion of said heating chamber is terminated at a level substantially equal to or lower than said bottom face portion of said heating chamber.

2. A drainage hole structure in accordance with claim 1, in which said upper end opening of said drain pipe is located in close proximity to an air blowing side of a fan used for a forced convection, which is arranged in a back face side of said heating chamber, and said other end opening of said air suction pipe is located in close proximity to an air suction side of said fan.

3. A drainage hole structure in accordance with claim 2, in which said air suction pipe is integrated with a fan guard which is to be disposed in front of said fan.

* * * * *